United States Patent
Fujita et al.

(10) Patent No.: US 7,360,013 B2
(45) Date of Patent: Apr. 15, 2008

(54) METHOD OF REWRITING FLASH EEPROM AND ELECTRONIC CONTROL DEVICE USING SAME

(75) Inventors: Yoichi Fujita, Toyoake (JP);
Mitsuyoshi Natsume, Hekinan (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 209 days.

(21) Appl. No.: 11/366,461

(22) Filed: Mar. 3, 2006

(65) Prior Publication Data
US 2006/0200618 A1  Sep. 7, 2006

(30) Foreign Application Priority Data
Mar. 3, 2005 (JP) .............................. 2005-058854

(51) Int. Cl.
G06F 9/445 (2006.01)
G06F 12/00 (2006.01)

(52) U.S. Cl. .................. 711/103; 712/229; 717/168

(58) Field of Classification Search ............... 711/103; 712/228, 229; 717/168
See application file for complete search history.

(56) References Cited

U.S. PATENT DOCUMENTS

| | | | |
|---|---|---|---|
| 6,507,881 B1 * | 1/2003 | Chen ........................ | 710/305 |
| 6,662,314 B1 * | 12/2003 | Iwata et al. ................ | 714/42 |
| 2003/0167371 A1 * | 9/2003 | Katahira .................... | 711/103 |
| 2004/0268023 A1 * | 12/2004 | Hori ........................... | 711/103 |
| 2005/0010914 A1 * | 1/2005 | Liang et al. ................ | 717/168 |

FOREIGN PATENT DOCUMENTS

| | | |
|---|---|---|
| JP | 11-175331 | 7/1999 |
| JP | 2001-265601 | 9/2001 |
| JP | 2003-303132 | 10/2003 |

* cited by examiner

Primary Examiner—Jack Lane
(74) Attorney, Agent, or Firm—Nixon & Vanderhye P.C.

(57) ABSTRACT

A method of rewriting a flash EEPROM of an electronic control device for controlling a vehicle equipment via a microcomputer is proposed. The flash EEPROM stores a control program and a flash EEPROM rewriting program. The operation of the vehicle equipment is changed by changing the control program via a microcomputer. When receiving a control-program-rewriting command signal, data on an internal condition and state of connection of the microcomputer are memorized. Then, the control program is changed to the flash EEPROM rewriting program, so that the data are read according to the flash EEPROM rewriting program to control the microcomputer to operate in the same internal condition and state of connection thereof as before. Thereafter, the microcomputer rewrites the flash EEPROM with a new control program sent from outside. Therefore, the vehicle equipment can be continuously operated by a user during the rewriting mode.

13 Claims, 5 Drawing Sheets

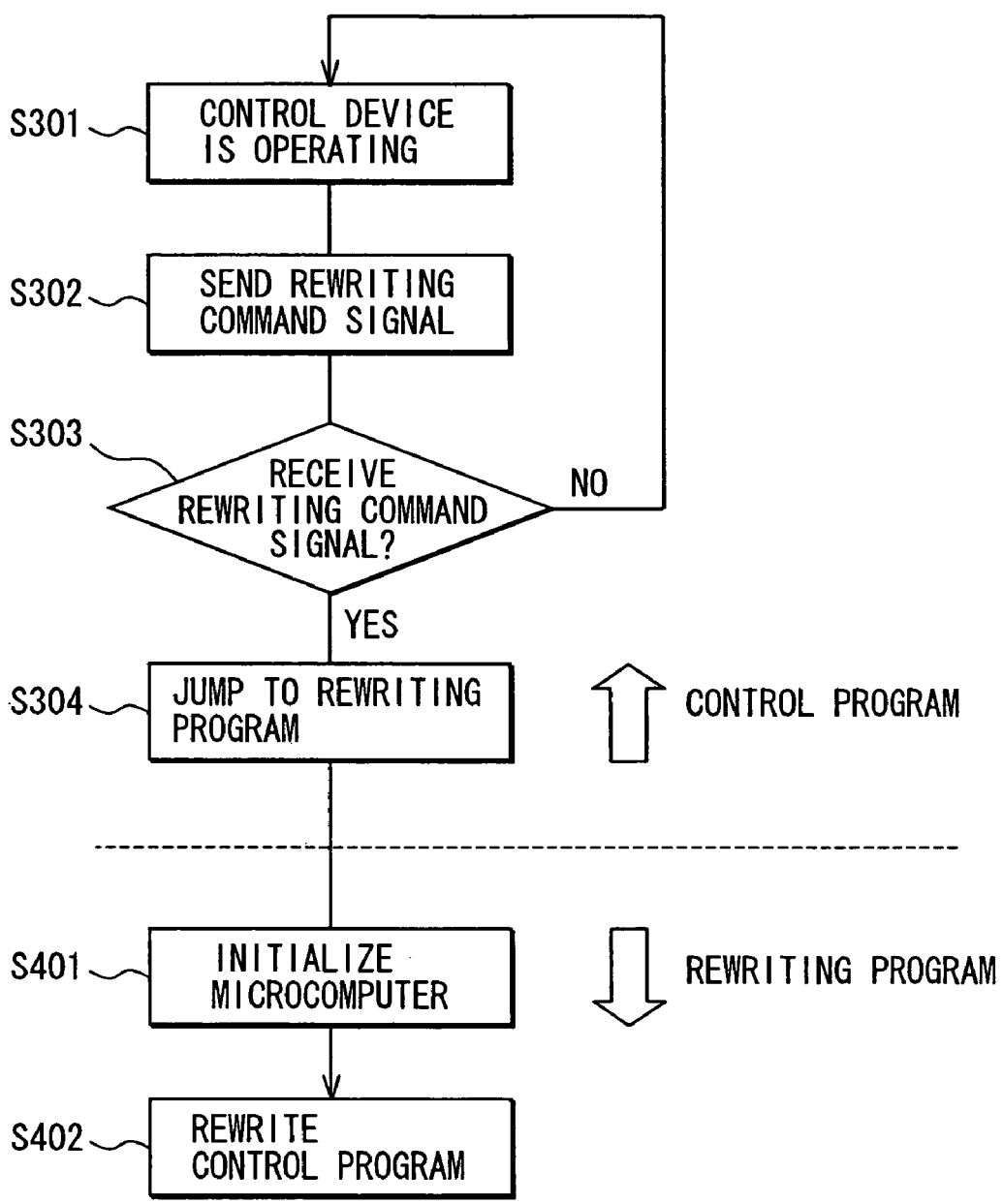

METHOD OF REWRITING FLASH EEPROM AND ELECTRONIC CONTROL DEVICE USING SAME

CROSS REFERENCE TO RELATED APPLICATION

The present application is based on and claims priority from Japanese Patent Application 2005-58854, filed Mar. 3, 2005, the contents of which are incorporated herein by reference.

BACKGROUND OF THE INVENTION

1. Field of the Invention

The present invention relates to a method of rewriting a control program stored in a flash EEPROM and an on-board electronic device that uses the method of rewriting.

2. Description of the Related Art

JP-A-Hei 11-175331 and JP-A 2001-265601 disclose on-board electronic control devices for controlling vehicle equipment such as an engine or a gear transmission system. Such a device includes a rewritable flash EEPROM so as to be able to rewrite the control program stored in the flash EEPROM even after the vehicle is put on the market.

This kind of on-board electronic device normally controls vehicle equipment such as an engine or a gear transmission system according to a control program that is already stored in the flash EEPROM. When a rewriting command signal is sent from an outside rewriting device, the originally stored control program is rewritten with a new control program that is sent from the outside rewriting device. Thus, operation of vehicle equipment can be changed.

As shown in FIG. 5 of this application, when a rewriting command signal is sent to an on-board electronic device at step S302 while it is controlling vehicle equipment according to the original control program at S301, whether the on-board electronic device receives the rewriting command signal or not is examined at step S303. If the result of the examination is "Yes", the control program is jumped to a flash EEPROM rewriting program at S304. After the original control program is changed to the flash EEPROM rewriting program at S401, a microcomputer is controlled under an initial condition after being reset to rewrite the flash EEPROM at S402.

When the flash EEPROM that is included in a microcomputer is to be rewritten, the flash EEPROM rewriting program starts, so that the microcomputer is reset to be under the initial condition, so that the microcomputer cannot be operated by a user. Although it is desirable that the vehicle equipment can be continuously controlled by the on-board electronic device while the flash EEPROM rewriting program is operating, such a control is impossible. For example, once the flash EEPROM rewriting program operates, a low level output signal cannot be continuously supplied to the port of the microcomputer, resulting in that a user cannot operate the vehicle equipment that is connected to the microcomputer.

SUMMARY OF THE INVENTION

Therefore, a first object of the invention is to provide an improved method of rewriting a flash EEPROM that is included in a microcomputer so that vehicle equipment can be continuously operated while the flash EEPROM is being rewritten. For this purpose, data on the internal condition and the state of connection of the microcomputer are sent to the flash EEPROM rewriting program when the original control program is changed to the flash EEPROM rewriting program.

A second object of the invention is to provide an improved method of rewriting a flash EEPROM in which a user-desired condition and state of connection of the microcomputer are transmitted to the flash EEPROM rewriting program when the original control program is changed to the flash EEPROM rewriting program.

A third object of the invention is to provide an improved method of changing operation of a vehicle equipment.

A fourth object of the invention is to provide an electronic device in which data on the condition and state of connection of the microcomputer are transmitted to the flash EEPROM rewriting program when the original control program is changed to the flash EEPROM rewriting program.

A fifth object of the invention is to provide an electronic device in which desirable condition and state of connection of the microcomputer are transmitted to the flash EEPROM rewriting program when the original control program is changed to the flash EEPROM rewriting program.

According to a main feature of the invention, a method of rewriting a control program stored in a flash EEPROM with a new control program received from an outside device via a microcomputer, the method includes steps of: storing data on an internal condition and state of connection of the microcomputer when receiving a control-program-rewriting command signal; changing the control program to a flash EEPROM rewriting program; reading the data on the internal condition and state of connection of the microcomputer according to the flash EEPROM rewriting program to control the microcomputer to operate in the same internal condition and state of connection; and rewriting the flash EEPROM with the new control program via the microcomputer.

Therefore, a vehicle equipment can be continuously operated by a user. Further, because the vehicle equipment is continuously operated, the user does not worry about failure of the vehicle equipment, which used to be impossible to operate by the user.

According to another feature of the invention, a method of changing operation of a vehicle equipment controlled by a electronic control device including a flash EEPROM by changing a control program stored in the flash EEPROM via a microcomputer connected to the flash EEPROM includes steps of: storing data on an internal condition and a state of connection of the microcomputer when receiving a control-program-rewriting command signal; jumping from the control program to the flash EEPROM rewriting program; reading the data according to the flash EEPROM rewriting program to control the microcomputer to operate in the same internal condition and state of connection; and rewriting by the microcomputer the flash EEPROM with a new control program received from outside.

According to another feature of the invention, a method of changing operation of a vehicle equipment controlled by a electronic control device including a flash EEPROM by changing a control program stored in the flash EEPROM via a microcomputer connected to the flash EEPROM includes steps of: storing data on a desired internal condition and state of connection of the microcomputer; changing the original control program to the flash EEPROM rewriting program when receiving control-program-rewriting command signal; reading the data stored in the condition data area according to the flash EEPROM rewriting program to control the microcomputer to operate in the desired internal condition and state of connection; and rewriting by the microcomputer the flash EEPROM with a new control program received from outside.

Therefore, the user can operate vehicle equipment as he desires just after the flash EEPROM has been rewritten.

According to another feature of the invention, an electronic control device having a program rewriting microcomputer and a flash EEPROM storing an original control program includes: means for storing data on an internal condition and state of connection of the microcomputer when receiving a control-program-rewriting command signal; means for changing the original control program to a flash EEPROM rewriting program; means for reading the data stored according to the flash EEPROM rewriting program to control the microcomputer to operate in the same internal condition and state of connection; and means for rewriting the flash EEPROM with the new control program by the microcomputer.

In the above electronic control device, the means for storing data may include a data memory area disposed in a register or a RAM of the microcomputer.

According to another feature of the invention, an electronic control device having a program rewriting microcomputer and a flash EEPROM storing an original control program includes: means for storing data on a desired internal condition and state of connection of the microcomputer; means for changing the original control program to a flash EEPROM rewriting program when receiving control-program-rewriting command signal; means for reading the data stored according to the flash EEPROM rewriting program to control the microcomputer to operate in the desired internal condition and state of connection; and means for rewriting the flash EEPROM with the new control program by the microcomputer.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 5 is a flow diagram showing steps of a prior art method of rewriting flash EEPROM.

DETAILED DESCRIPTION OF THE PREFERRED EMBODIMENTS

Figure 1:
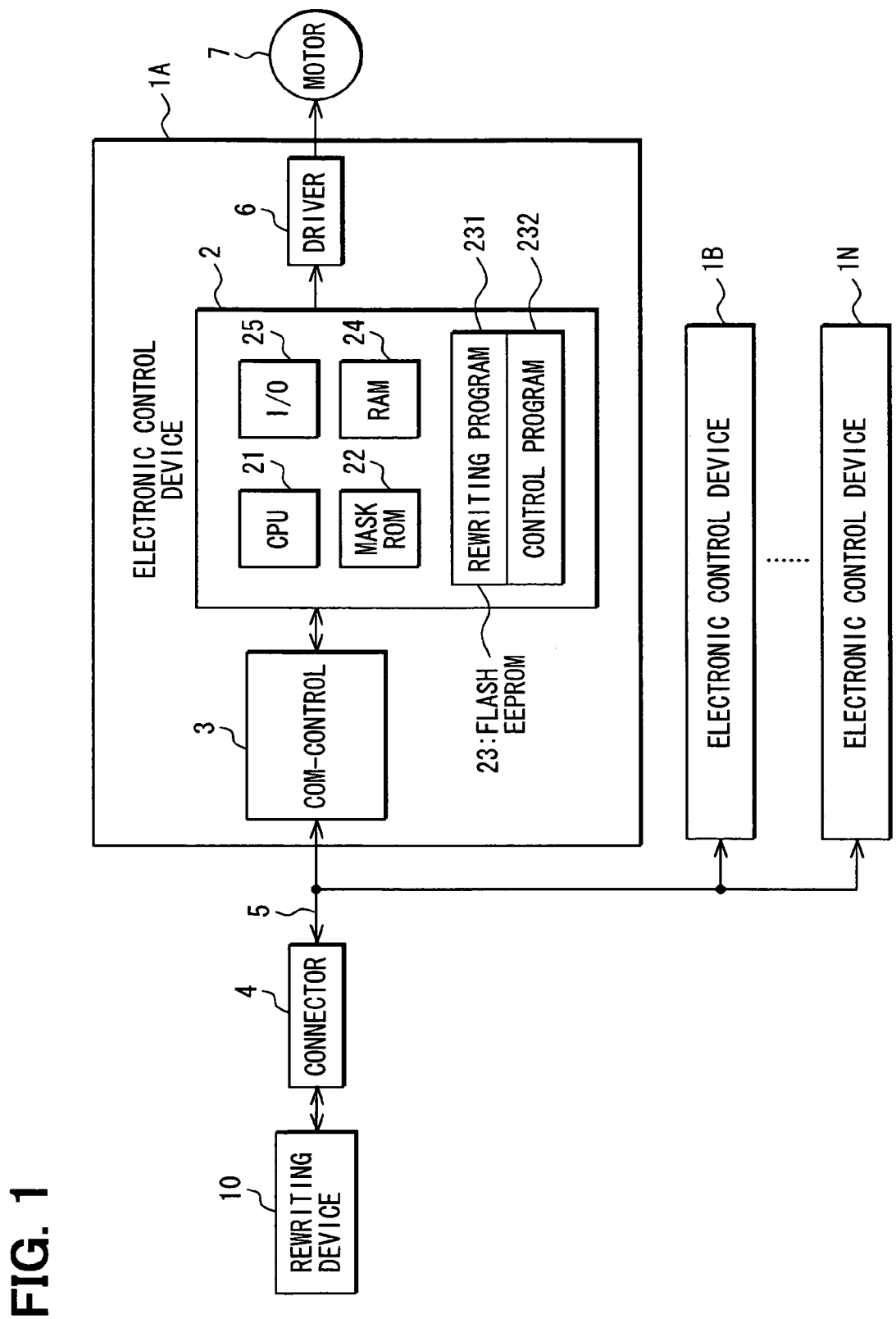
FIG. 1 is a block diagram showing construction of an electronic control device for controlling an electric motor by use of a method of rewriting flash EEPROM according to the first embodiment of the invention.

As shown in FIG. 1, an electronic control system is constituted of a plurality of electronic control devices 1A, 1B, . . . 1N. The electronic control device according to the first embodiment of the invention may be an electronic engine control system for controlling fuel to be injected into an engine, an electronic body control system for vehicle door locking and unlocking control, an electronic braking control system, an electronic traction control system, an electronic vehicle cruise control system, etc. The electronic control device 1A, 1B, . . . 1N are connected together and to a connector 4 via communication lines 5. The communication lines are included in a LAN, such as CAN (Car Area network), Safe-by Wire, or Flex Ray. The connector 4 is connected to a flash EEPROM rewriting device 10, which can be disconnected as desired. The electronic control device 1A includes a microcomputer 2, a communication control device 3 and a driver 6. The communication control device 3 controls data communication between the microcomputer 2 and the flash EEPROM rewriting device 10, which is an outside device.

The microcomputer 2 includes a CPU 21 that executes a control program, a mask ROM 22 that stores the program to be executed by the CPU 21, a flash EEPROM 23, RAM 24 that temporarily stores what are carried out by the CPU 21, an input data processing circuit (not shown), an output circuit (not shown), I/O circuit 25 that exchanges data between the output circuit and the communication control device 3, various registers (not shown), etc. The flash EEPROM 23 is an electronically erasable and programmable ROM that can erase all of the data stored in a block and sequentially write data. The flash EEPROM 23 already stores a flash EEPROM rewriting program 231 and a vehicle equipment control program 232. Incidentally, the flash EEPROM rewriting program 231 may be stored in a mask ROM 22 or in both the flash EEPROM 23 and the mask ROM 22.

The electronic control device 1A is connected to an outside flash EEPROM rewriting device 10 when the control program 232 stored in the 23 is rewritten with a new control program transmitted via the communication lines 5. The electronic control device 1A is connected via the driver 6 to a motor 7 included in the vehicle equipment to be controlled.

The outside flash EEPROM rewriting device 10 includes a microcomputer, a memory, a display, keyboard, etc. As shown in FIG. 1, the electronic control device 1A and the outside flash EEPROM rewriting device 10 are connected via the connector 4.

Figure 2:
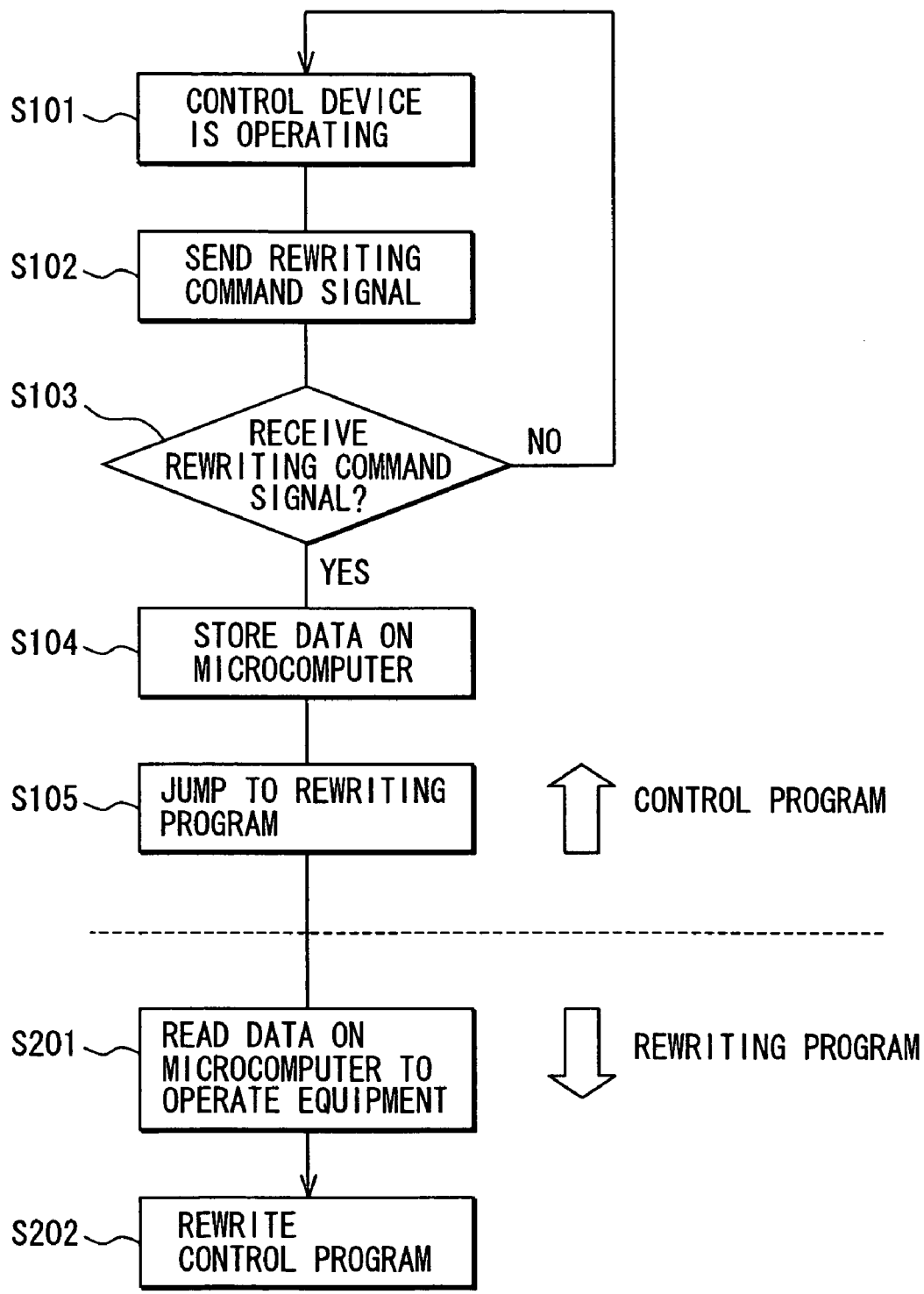
FIG. 2 is a flow diagram showing steps of the method of rewriting flash EEPROM according to the first embodiment of the invention.

A method of rewriting the flash EEPROM 23 according to the first embodiment of the invention will be described with reference to FIGS. 1 and 2.

When the ignition switch of a vehicle is turned on, a reset signal of the microcomputer 2 of the electronic control device 1A is released. Then, the CPU 21 starts executing the control program 232 stored in the flash EEPROM 23. The CPU 21 is initialized according to the control program 232 and starts controlling a certain vehicle equipment.

As long as a control program rewriting command signal is not sent from the outside flash EEPROM rewriting device 10 to the electronic control device 1A, the CPU 21 controls the vehicle equipment in a usual control mode according to the control program 232 at step S101.

When the outside flash EEPROM rewriting device 10 sends the control program rewriting command signal to the electronic control device 1A via the communication line 5 at S102, the CPU 21 of the electronic control device 1A examines whether it receives the control program rewriting command signal or not at S103.

If the examination result of the step S102 is No, the step returns to S101, where CPU 21 controls the vehicle equipment in the usual control mode. If the examination result is Yes, the CPU 21, according to the control program 232, obtains data on the current condition of the microcomputer such as the internal condition and the state of connection and stores the data in a condition data area of a control register (not shown), the RAM 24 or the flash EEPROM 23 at S104. In this case, it is necessary to store a desired internal condition and a state of connection in the condition data area beforehand.

Then the CPU 21 jumps from the control program 232 to the flash EEPROM rewriting program 231 at S105, where the control mode of the CPU 21 changes from a normal control mode to a flash EEPROM rewriting mode. In the meanwhile, the microcomputer 2 is not reset to be initialized but is in the same condition as the control program is being executed.

Thereafter, the CPU 21 reads, according to the flash EEPROM rewriting program 231, the internal condition data from the condition data area and controls the microcomputer to operate in the same internal condition and state of connection as before at S201.

Incidentally, if the condition data area is provided in the flash EEPROM 23, the microcomputer 2 is not reset to be initialized but is controlled to have a desired internal condition and state of connection that are stored therein beforehand.

Thereafter, the CPU 21 rewrites the control program 232 stored in the flash EEPROM 23 according to the flash EEPROM rewriting program 231 at S202. In more detail, because the outside flash EEPROM rewriting device 10 sequentially sends control programs that are stored in its memory, the CPU 21 rewrites the previous control program with a new control program received thereby, according to the flash EEPROM rewriting program 231.

When the program-rewriting into the flash EEPROM 23 is completed, the CPU 21 jumps from the flash EEPROM rewriting program 231 to the control program 232, so that the control mode of the CPU 21 returns to the normal control mode from the flash EEPROM rewriting mode.

Thus, the motor 7 can be continuously controlled by a user before and after the flash EEPROM is rewritten.

Figure 3:
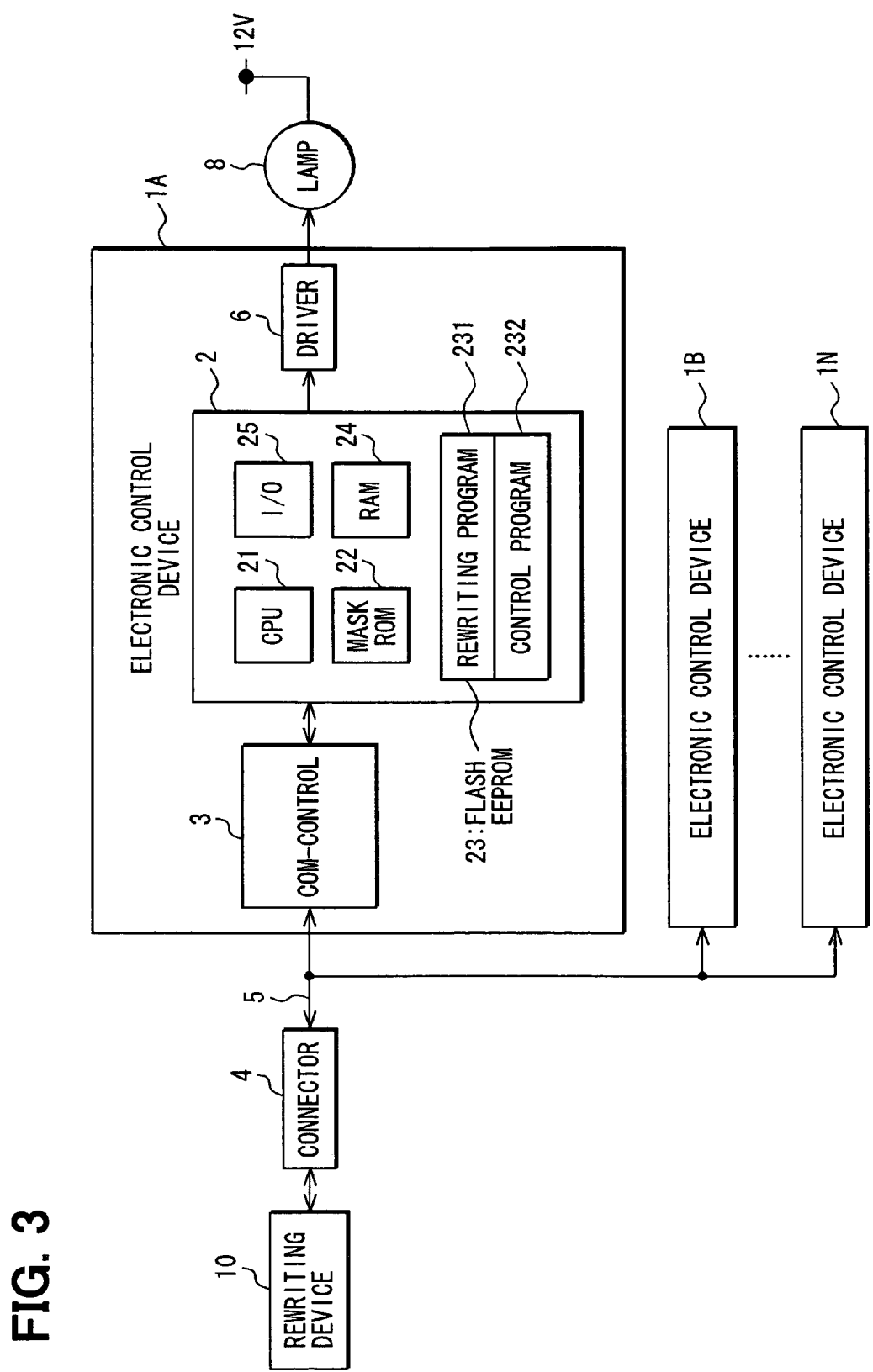
FIG. 3 is a block diagram showing construction of an electronic control device for controlling a lamp by use of a method of rewriting flash EEPROM according to the second embodiment of the invention.

An electronic control device according to the second embodiment of the invention will be described with reference to FIG. 3 in which the motor 7 shown in FIG. 1 is replaced with a lamp 8 that is connected to a 12V-DC source. Incidentally, the same reference numeral indicates the same or substantially the same part, component or circuit as the first embodiment in the following description.

The condition data area is provided in a control register or the RAM 24. If the lamp 8 is operating in a usual control mode, the lamp 8 will continuously operate during the flash EEPROM rewriting mode. On the other hand, the lamp 8 remains turned off during the flash EEPROM rewriting mode if it has been turned off.

If a desired operation of the lamp 8 is intended, the condition data area is provided in the flash EEPROM 23.

Figure 4:
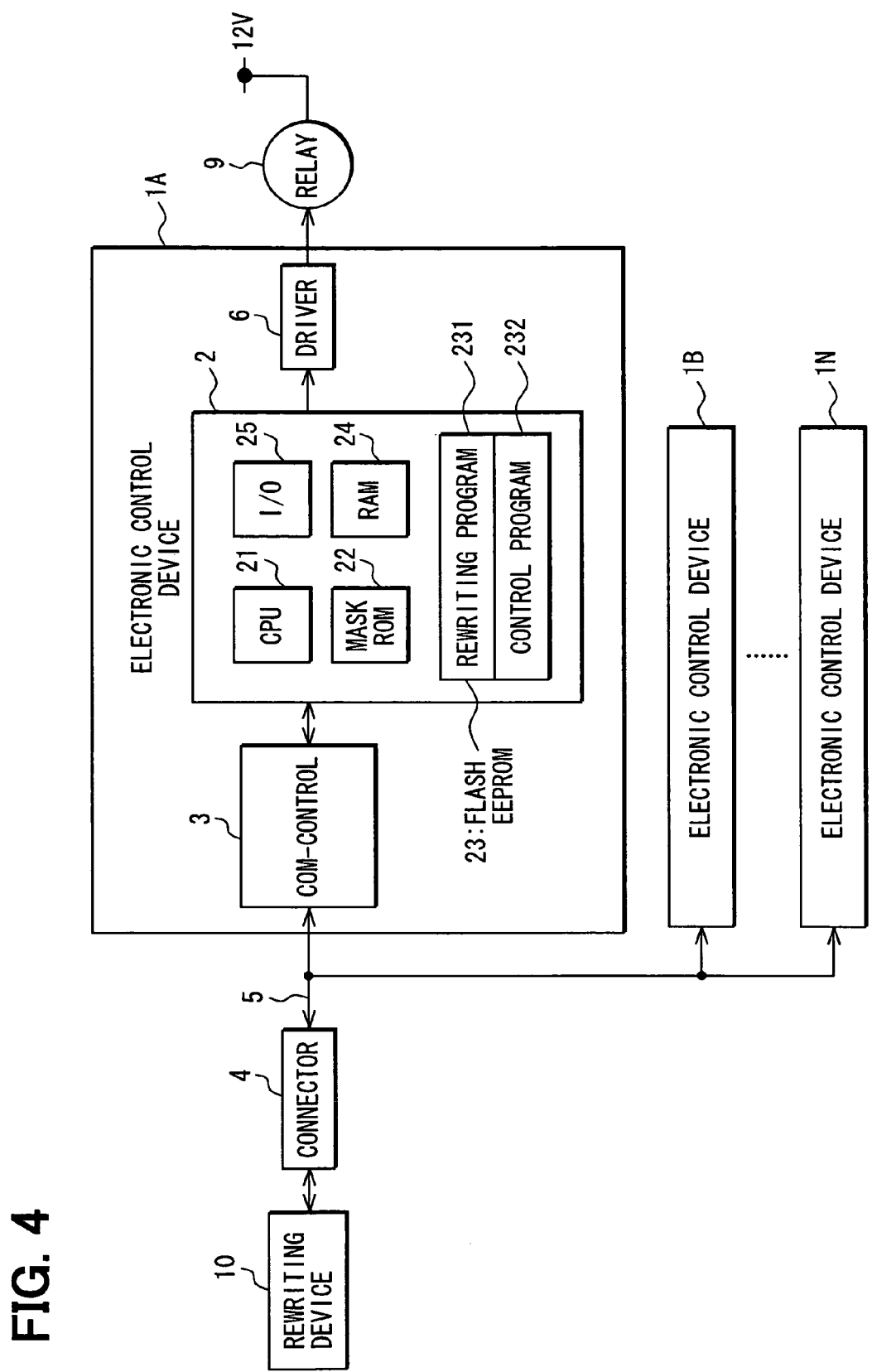
FIG. 4 is a block diagram showing construction of an electronic control device for controlling a relay by use of a method of rewriting flash EEPROM according to the third embodiment of the invention.

An electronic control device according to the third embodiment of the invention will be described with reference to FIG. 4 in which the lamp 8 is replaced with a relay 9 of the second embodiment.

The condition data area is provided in a control register or the RAM 24. If the relay 9 is operating in a usual control mode, it will continuously operate during the flash EEPROM rewriting mode. On the other hand, the relay 9 remains turned off during the flash EEPROM rewriting mode if it has been turned off.

If a desired operation of the relay 9 is intended, the condition data area is provided in the flash EEPROM 23.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A method of rewriting a control program stored in a flash EEPROM with a new control program received from an outside device via a microcomputer, the method comprising the steps of:

storing data on an internal condition and state of connection of the microcomputer when receiving a control-program-rewriting command signal;

changing the control program to a flash EEPROM rewriting program;

reading the data according to the flash EEPROM rewriting program to control the microcomputer to operate in the same internal condition and state of connection; and rewriting the flash EEPROM with the new control program via the microcomputer.

2. The method as claimed in claim 1, wherein the data are stored in a register of the microcomputer.

3. The method as claimed in claim 1, wherein the data are stored in a RAM of the microcomputer.

4. A method of rewriting a control program stored in a flash EEPROM with a new control program received from an outside device via a microcomputer, the method comprising the steps of:

storing data on a desired internal condition and state of connection of the microcomputer;

changing the original control program to a flash EEPROM rewriting program when receiving a control-program-rewriting command signal;

reading the data according to the flash EEPROM rewriting program to control the microcomputer to operate in the desired internal condition and state of connection; and rewriting the flash EEPROM with the new control program by the microcomputer.

5. A method of changing operation of a vehicle equipment controlled by a electronic control device including a flash EEPROM by changing a control program stored in the flash EEPROM via a microcomputer connected to the flash EEPROM, the method comprising the steps of:

storing data on an internal condition and a state of connection of the microcomputer when receiving a control-program-rewriting command signal;

jumping from the control program to the flash EEPROM rewriting program;

reading the data according to the flash EEPROM rewriting program to control the microcomputer to operate in the same internal condition and state of connection; and rewriting by the microcomputer the flash EEPROM with a new control program received from outside.

6. The method as claimed in claim 5, wherein the vehicle equipment includes a motor to be controlled.

7. The method as claimed in claim 5, wherein the vehicle equipment includes a lamp to be controlled.

8. The method as claimed in claim 5, wherein the vehicle equipment includes a relay to be controlled.

9. A method of changing operation of a vehicle equipment controlled by a electronic control device including a flash EEPROM by changing a control program stored in the flash EEPROM via a microcomputer connected to the flash EEPROM, the method comprising the steps of:

storing data on a desired internal condition and state of connection of the microcomputer;

changing the original control program to the flash EEPROM rewriting program when receiving control-program-rewriting command signal;

reading the data stored in the condition data area according to the flash EEPROM rewriting program to control the microcomputer to operate in the desired internal condition and state of connection; and rewriting by the microcomputer the flash EEPROM with a new control program received from outside.

10. An electronic control device having a program rewriting microcomputer and a flash EEPROM storing an original control program comprising:

means for storing data on an internal condition and state of connection of the microcomputer when receiving a control-program-rewriting command signal;

means for changing the original control program to a flash EEPROM rewriting program;

means for reading the data stored according to the flash EEPROM rewriting program to control the microcomputer to operate in the same internal condition and state of connection; and means for rewriting the flash EEPROM with the new control program by the microcomputer.

11. The electronic control device as claimed in claim 10, wherein the means for storing data includes a data memory area disposed in a register of the microcomputer.

12. The method as claimed in claim 10, wherein the means for storing data includes a data memory area disposed in a RAM of the microcomputer.

13. An electronic control device having a program rewriting microcomputer and a flash EEPROM storing an original control program comprising:

means for storing data on a desired internal condition and state of connection of the microcomputer;

means for changing the original control program to a flash EEPROM rewriting program when receiving control-program-rewriting command signal;

means for reading the data stored according to the flash EEPROM rewriting program to control the microcomputer to operate in the desired internal condition and state of connection; and means for rewriting the flash EEPROM with the new control program by the microcomputer.

* * * * *